I. COLE.

Children's Carriages.

No. 6,155. Reissued Dec. 1, 1874.

Witnesses

Oliver Drake
Elias Francis

Inventor

Isaac Cole
By Drake & Co Att'ys

THE GRAPHIC CO. PHOTO-LITH. 39 & 41 PARK PLACE, N.Y.

UNITED STATES PATENT OFFICE.

ISAAC COLE, OF NEWARK, NEW JERSEY, ASSIGNOR TO HIMSELF AND GEORGE M. BALLARD.

IMPROVEMENT IN CHILDREN'S CARRIAGES.

Specification forming part of Letters Patent No. 123,241, dated January 30, 1872; reissue No. 6,155, dated December 1, 1874; application filed September 21, 1874.

*To all whom it may concern:*

Be it known that I, ISAAC COLE, of the city of Newark, in the county of Essex and State of New Jersey, have invented a new and useful Improvement in Children's Carriages or Perambulators; and I do hereby declare that the following is a full, clear, and exact description of the same, such as will enable others skilled in the art to make and use the same, reference being had to the accompanying drawing forming part of this specification, in which—

Figure 1:
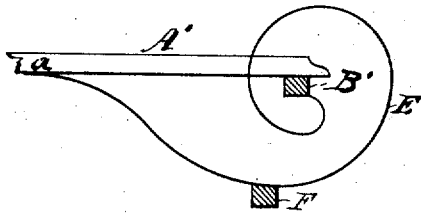
Figure 2:
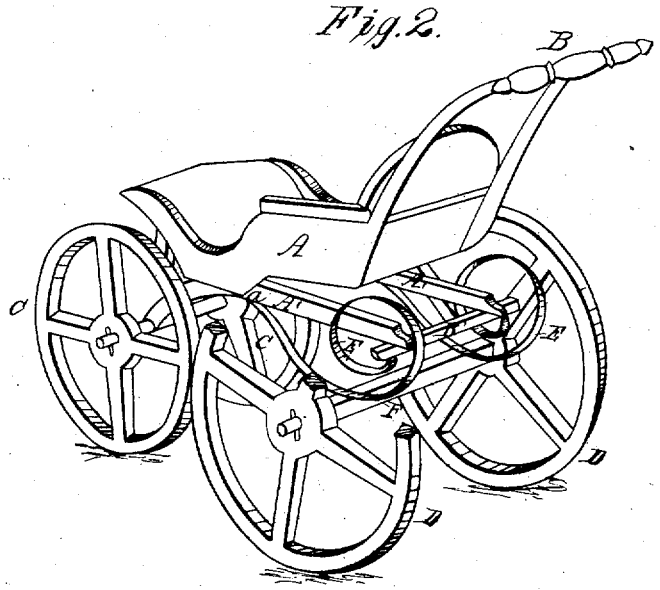

Figure 1 is a detached side view of a spring attached to the side sills, axle, and spring-bar of a child's carriage or perambulator. Fig. 2 is a perspective view of the child's carriage or perambulator as complete, showing the arrangement of the springs, spring-bar, and side sills.

The object of this invention is to improve upon the means heretofore adopted for supporting or hanging the bodies of children's carriages or perambulators, so as to render the same more attractive in appearance, and to lessen and deaden the transmission of jars from the wheels to the occupant in the carriage when the wheels are passing over rough ground or come in contact with stones, &c.

My invention consists in attaching scroll-springs, E, to a child's carriage or perambulator by means of a spring-bar, B′, attached to side sills A′ A′, or other suitable supports to the body, or by means of braces or beams projecting out from the back of the body to the end of said scroll-springs separate and independent of the side sills A′, so that by the flexibility secured by such an arrangement and combination of the springs all jars and concussions received by the wheels will be to a great extent deadened and not transmitted to the body of the carriage.

In the drawing, the letter A designates the body of a child's carriage or perambulator; B, the handle; C C, the front, and D D the rear, wheels, all of which are the same as those of the ordinary construction. The body A rests upon the side sills A′, or other suitable supports, which, at their front ends, support the axle of the front wheels, while at or near their rear ends is arranged a spring-bar, B′, supported on the scroll-springs, which are secured to the rear axle F. This spring-bar B′ may be made of wood, steel, or other metal, and in form straight, semi-elliptical, or otherwise, and, as above stated, rests upon and is secured to the ends of the scroll-springs E, which in their circuit pass up and around said spring-bar, and are bolted or otherwise secured to the axle F and the body A at or near the point *a*, substantially as shown. When the body is thus supported, if either wheel is suddenly elevated by contact with any obstructions, the spring next to the wheel thus acted upon will by its flexibility impart a soft and easy motion to the body. It is not my intention, however, to confine myself to fastening the spring-bar B′ to the side sills A′, as the body may be secured and supported by means of braces secured thereto, and connected to the spring-bar independent of said side sills.

Having thus described my invention, what I claim, and desire to secure by Letters Patent of the United States, is—

1. In a child's carriage or perambulator, the spring-bar B′ in the rear of the body A, and secured to the scroll-springs E, which are secured to the axle F and body A, the body being supported upon the spring-bar by means of the side sills A′, or other suitable supports, all combined substantially as and for the purposes set forth.

2. In a child's carriage or perambulator, the scroll-springs E, secured to the rear axle F, and having their ends connected to the body A and the spring-bar B′, or to braces which connect with the body A independently of the side sills, all combined substantially as set forth.

ISAAC COLE.

Witnesses:
GEO. H. WILSON,
GEO. W. FRANCIS.